No. 688,395. Patented Dec. 10, 1901.
H. C. DAVIS & J. BAILEY.
NUT LOCK.
(Application filed Aug. 20, 1900.)

(No Model.)

Witnesses:
R. Lee Hearn.
R. E. Randle.

Inventors:
Homer C. Davis
and
John Bailey;
By their Attorney;
Robert W. Randle.

UNITED STATES PATENT OFFICE.

HOMER C. DAVIS AND JOHN BAILEY, OF CONNELLSVILLE, PENNSYLVANIA.

NUT-LOCK.

SPECIFICATION forming part of Letters Patent No. 688,395, dated December 10, 1901.

Application filed August 20, 1900. Serial No. 27,431. (No model.)

*To all whom it may concern:*

Be it known that we, HOMER C. DAVIS and JOHN BAILEY, citizens of the United States, residing at Connellsville, in the county of Fayette and State of Pennsylvania, have invented new and useful Improvements in Nut-Locks, of which the following is a specification.

Our invention relates to improvements in nut-locks; and the objects of our invention are, first, to provide a nut-lock especially adapted for use on vehicles on the nuts used to retain the wheels on the axle; second, to afford facilities for the proper retention of a nut on the axle of a vehicle, and, third, to provide a new article of manufacture in a nut-lock simple in construction and easy of operation. We attain these objects by the mechanism, arrangement, and combination of parts illustrated in the accompanying drawings, in which—

Figure 1:
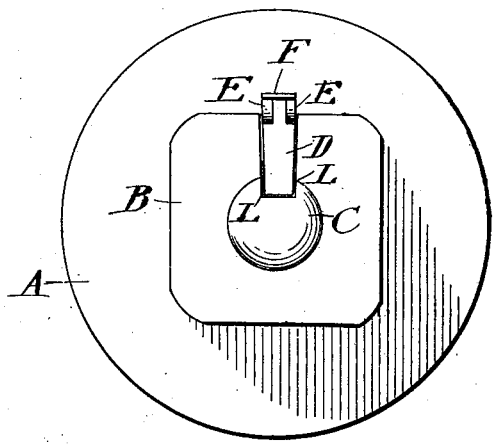
Figure 2:
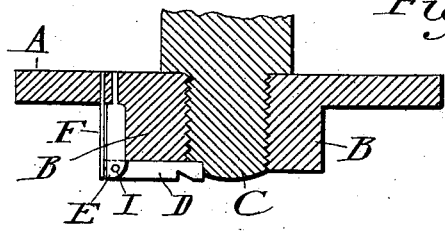

Figure 1 is a face view of an axle-nut, showing our invention in connection therewith. Fig. 2 is a sectional view of the above, showing the details of our invention.

Similar letters refer to similar parts in both views.

The parts A and B represent an ordinary vehicle-axle nut, and C the outer end of an ordinary vehicle-axle, onto which the nut referred to is screwed.

It is a well-known fact that the nut A B frequently accidentally works off of the axle C in backing the vehicle or otherwise to the damage of the vehicle and endangering life and limb. To prevent this, we provide the nuts with a locking device consisting of the stationary member E, secured at one end to the body of the nut, the other end being provided with a hinge-joint, into which a movable member D is journaled, the two parts E and D being pivotally united by the pin I. It will now be seen that the member D can be moved into alinement with the member E or changed to stand at right angles thereto, as shown in Fig. 2. A U-shaped recess is formed in the edge of one side of the point of the axle C of a size sufficient to receive the point of the arm D, as shown.

It is apparent that the arm D can be turned in the pivot I to stand parallel with the member E. The nut A B can then be run on the axle C to the point desired, being careful that the recess in the point of the axle will be opposite the arm D. Said arm is then brought toward the axle until it stands at right angles to the member E, when the outer point of D will have entered the recess in the axle, thus securely locking the nut on the axle, as can be seen.

To retain the member D in contact with the recess in the axle or to retain it in alinement with the member E, we provide a flat spring F parallel with E, so that it will continually press upon the square end of D near the joint, thus gently retaining the arm D in an open or closed position.

It is evident that changes in and modifications of the device herein shown and described may be made without departing from the spirit of our invention or sacrificing any of its advantages.

Having described our invention, what we claim as new, and desire to secure by Letters Patent of the United States, is—

In a nut-lock, the combination of a nut provided with a stationary member permanently secured to the nut, a movable member pivoted to the free end of the stationary member, a spring parallel to the stationary member and adapted to secure the movable member in its operative position and a recess in said nut in which the movable member is adapted to fit, with a bolt provided with a recess to secure the free end of said movable member when the recesses register.

In testimony whereof we have signed our names to this specification in the presence of two subscribing witnesses.

HOMER C. DAVIS.
JOHN BAILEY.

Witnesses:
SAML. KURTZ,
JOHN KURTZ.